(12) United States Patent
Lopez et al.

(10) Patent No.: US 11,136,942 B2
(45) Date of Patent: Oct. 5, 2021

(54) ACOUSTIC DEEP CAVITY CENTERBODY

(71) Applicant: Rohr, Inc., Chula Vista, CA (US)

(72) Inventors: Carlos A. Lopez, Chula Vista, CA (US); Lisa K. Martini-Saliers, Chula Vista, CA (US); David Gaul, San Diego, CA (US); Jose S. Alonso-Miralles, Chula Vista, CA (US); Keith E. Ritchie, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 175 days.

(21) Appl. No.: 16/131,420

(22) Filed: Sep. 14, 2018

(65) Prior Publication Data

US 2020/0088135 A1 Mar. 19, 2020

(51) Int. Cl.
*F02K 1/04* (2006.01)
*F02K 1/82* (2006.01)

(52) U.S. Cl.
CPC .............. *F02K 1/827* (2013.01); *F02K 1/04* (2013.01); *F05D 2220/323* (2013.01); *F05D 2260/96* (2013.01)

(58) Field of Classification Search
CPC ........... F05D 2260/96; F05D 2260/964; F05D 2240/1281; F05D 2220/323; F02K 1/827; F02K 1/04
See application file for complete search history.

(56) References Cited

U.S. PATENT DOCUMENTS

| | | | |
|---|---|---|---|
| 4,064,961 A | 12/1977 | Tseo | |
| 4,137,992 A * | 2/1979 | Herman | F02K 1/827 |
| | | | 181/213 |
| 6,935,834 B2 * | 8/2005 | Lata Perez | F02C 7/24 |
| | | | 415/115 |
| RE39,972 E | 1/2008 | Royalty | |
| 7,784,283 B2 * | 8/2010 | Yu | F02K 1/04 |
| | | | 181/213 |
| 8,037,967 B2 * | 10/2011 | Mercat | F02K 1/827 |
| | | | 181/213 |
| 8,479,877 B2 * | 7/2013 | Todorovic | F02K 1/827 |
| | | | 181/213 |
| 8,919,136 B2 | 12/2014 | Conete | |
| 9,261,008 B2 * | 2/2016 | Mecuson | F01D 25/30 |
| 9,611,807 B2 | 4/2017 | Soulier et al. | |
| 9,784,215 B2 | 10/2017 | Lu et al. | |
| 10,066,581 B2 * | 9/2018 | Mecuson | F02K 1/80 |
| 2019/0162079 A1 * | 5/2019 | Bertandeau | F02K 1/827 |

FOREIGN PATENT DOCUMENTS

WO    WO2017077219    10/2017

OTHER PUBLICATIONS

EP search report for EP19197404.7 dated Feb. 7, 2020.

* cited by examiner

*Primary Examiner* — Alain Chau
*Assistant Examiner* — Sean V Meiller
(74) *Attorney, Agent, or Firm* — Getz Balich LLC

(57) ABSTRACT

Aspects of the disclosure are directed to a sound-absorbing exhaust center plug for an aircraft gas turbine engine comprising a center plug adapted for attachment within an exhaust nozzle of the engine. The center plug comprises an outer skin, and at least one cavity within the center plug and the at least one cavity extending between a forward bulkhead and an aft bulkhead, where the aft bulkhead is canted inwardly. The outer skin includes a plurality of outer skin openings providing an acoustic pathway through the outer skin and into the at least one cavity.

13 Claims, 7 Drawing Sheets

ACOUSTIC DEEP CAVITY CENTERBODY

BACKGROUND OF THE INVENTION

1. Technical Field

The present disclosure relates to an aircraft gas turbine engine exhaust nozzle deep-cavity centerbody, and more particularly to a centerbody that attenuates combustor noise and provides improved accessibility via a passage through the centerbody.

2. Background Information

An airplane's airframe and engines produce varying amounts of audible noise during takeoff and landing. For example, an aircraft's engines typically operate at or near maximum thrust as the aircraft departs from an airport, and lower thrust as the aircraft approaches an airport. Some aircraft engine noise can be partially suppressed at the engine nacelle inlet and the exhaust nozzle and centerbody by noise absorbing structure. These structures can absorb acoustic energy by canceling acoustic reflected waves and/or converting acoustic energy into heat, and typically consist of a porous skin and three or more non-perforated walls to form one or more chambers. Some have postulated that the porous skin and non-perforated walls of such chambers combine to form a plurality of Helmholtz resonators that resonate in response to certain sound frequencies or certain bands of frequencies, and cancel sound waves reflected between the porous face skin and non-perforated walls and/or subsequently convert sound energy to heat (via elastic or mechanical hysteresis caused by the resonant response of air within the resonator cavities and of the liner components), and thereby effectively absorb or dissipate at least a portion of generated engine noise. An example of a sound-absorbing exhaust nozzle center plug is disclosed in U.S. Pat. No. 7,784,283, which is assigned to the assignee of the present invention and incorporated herein reference.

Government regulators increasingly mandate aircraft engines with reduced noise signatures, and as a result, aircraft manufacturers, airline companies, and airport communities frequently demand such engines on aircraft. In order to achieve further reductions in modern aircraft gas turbine engine noise levels, especially during aircraft take-offs and approaches, it is desirable to dissipate some of the low-frequency noise generated by an engine's combustor. Accordingly, there is a need for an acoustically treated hot nozzle center plug for an aircraft gas turbine engine that is capable of dissipating some combustor exhaust noise having one or more frequencies less than about 800 Hz.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a sound-absorbing exhaust center plug for an aircraft gas turbine engine comprising a center plug adapted for attachment within an exhaust nozzle of the engine. The center plug comprises an outer skin, and at least one cavity within the center plug and the at least one cavity extending between a forward bulkhead and an aft bulkhead, where the aft bulkhead is canted inwardly. The outer skin includes a plurality of outer skin openings providing an acoustic pathway through the outer skin and into the at least one cavity.

The inwardly canted aft bulkhead may extend from a radially outer edge radially inward in a forward direction.

The least one cavity may comprise a forward cavity and an aft cavity that is substantially aft of the forward cavity, and a wall separating the forward cavity from the aft cavity, the wall including a plurality of first openings therethrough.

The outer skin may include a forward skin portion substantially coinciding with an axial position of the forward cavity and an aft skin portion, and where the plurality of outer skin openings are in the forward skin portion.

The forward bulkhead may be canted inwardly.

The center plug may comprise an inner skin forming a substantially hollow center portion of the plug body.

Aspects of the disclosure are also directed to a noise-absorbing center plug for a jet engine exhaust nozzle. The noise-absorbing center plug comprises a center plug adapted for assembly within the exhaust nozzle, and a plurality of walls defining a plurality of circumferentially spaced resonator cavities within the center body where the plurality of circumferentially spaced resonator cavities extend from a forward bulkhead to an aft bulkhead that is canted inwardly. The noise-absorbing center plug also comprises at least one wall separating at least one of the resonator cavities into a forward sub-cavity and an aft sub-cavity, the wall including a plurality of first openings therethrough.

The aft bulkhead may extend from a radially outer edge radially inward in a forward direction.

The noise-absorbing center plug may include an outer skin at least partially enclosing the circumferentially spaced resonator cavities.

The outer skin may include a plurality of second openings extending therethrough, the plurality of second openings providing acoustic pathways through the outer skin and into at least one forward sub-cavity.

The forward bulkhead may be canted inwardly.

The outer skin may include a plurality of second openings extending therethrough and a plurality of third openings extending therethrough, the plurality of second openings providing acoustic pathways through the outer skin and into at least one forward sub-cavity, and the plurality of third openings providing acoustic pathways through the outer skin and into at least one aft sub-cavity.

The noise-absorbing center plug may also include an inner skin forming a substantially open center cavity within the center plug.

Aspects of the disclosure are further directed to a noise-absorbing exhaust nozzle center plug for an aircraft gas turbine engine comprising a center plug having a first longitudinal axis. The plug body comprises an outer skin surrounding the center plug, an inner skin, the outer skin and the inner skin forming a substantially annular space therebetween axially extending between a forward bulkhead and inwardly canted aft bulkhead, and a plurality of walls separating the annular space into a plurality of substantially longitudinally-extending cavities. The center plug is configured for assembly within an exhaust nozzle of the aircraft gas turbine engine.

The outer skin may include a second plurality of openings extending therethrough, the second plurality of openings forming a plurality of acoustic pathways through the outer skin and into at least a portion of the longitudinally-extending cavities.

The forward and aft cavities may each have a largest dimension that extends in a substantially forward-aft direction.

The inwardly canted aft bulkhead may extend from a radially outer edge radially inward in a forward direction.

DETAILED DESCRIPTION

Figure 1:
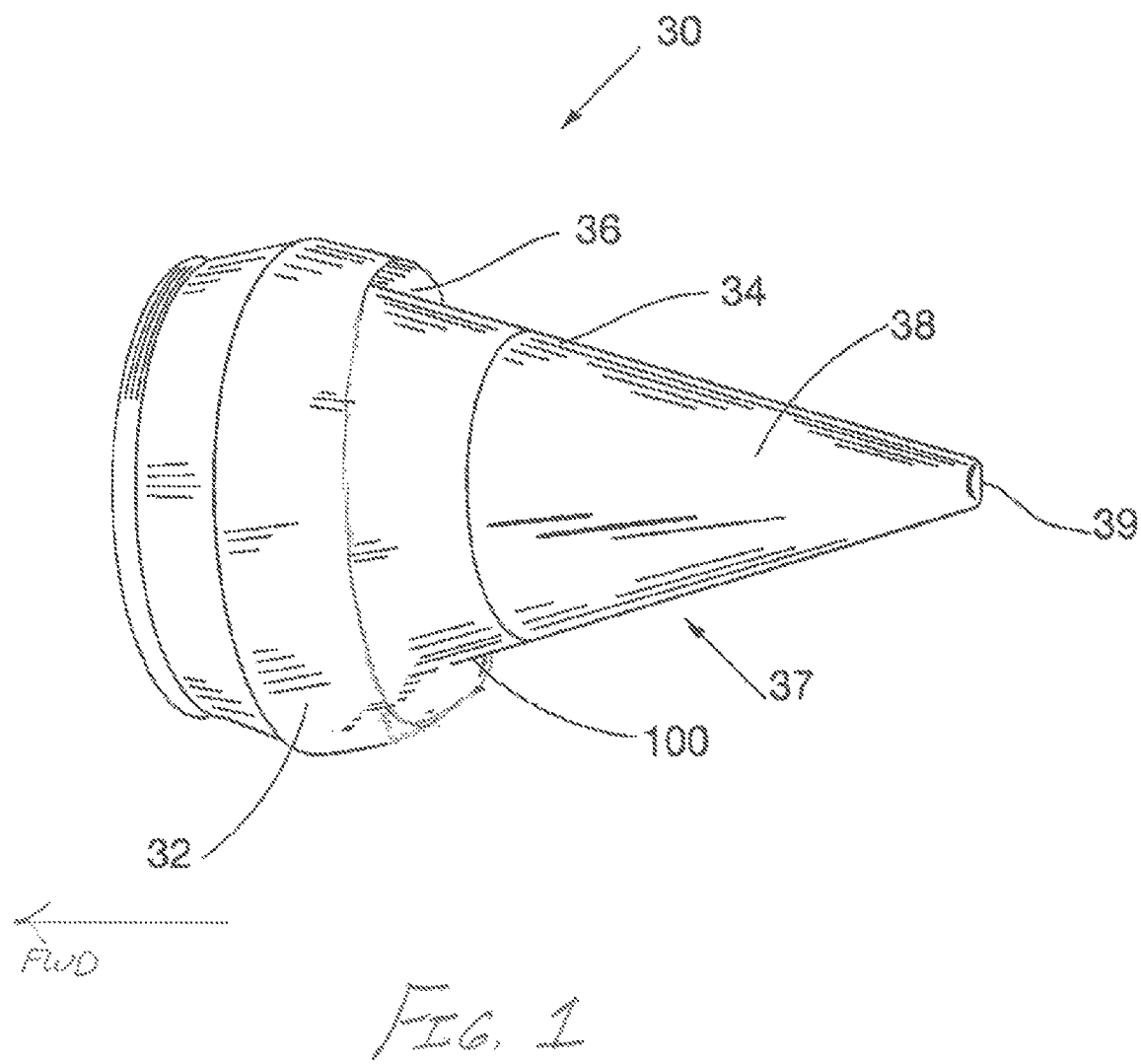
FIG. 1 is a perspective view of the combustor exhaust portion of an aircraft gas turbine engine including an acoustically treated center plug.

FIG. 1 shows one embodiment of a combustor exhaust portion 30 of an aircraft gas turbine engine. The combustor exhaust portion 30 includes an exhaust nozzle 32 and an exhaust centerbody 37. The centerbody 37 can be formed in two sections including an acoustically treated forward portion (referred to herein as a "center plug") 100, and an aft cone portion 38. The exhaust nozzle 32 and the center plug 100 cooperate to form an annulus 36 through which exhaust gasses from the engine's combustor exit the exhaust portion 30 to generate forward thrust. In this embodiment, the center plug 100 and the cone portion 38 of the centerbody 37 are connected along a circumferential seam 34 at the aft end of the center plug 100. In the embodiment shown in FIG. 1, the aft portion of the center plug 100 and the attached cone portion 38 extend aft from the aft end of the nozzle 32. The outer surfaces of the center plug 100 and the cone 38 combine to form a flow control surface that substantially prevents recirculation of the exiting exhaust gasses, and facilitates convergence of the exhaust gasses as they exit the annulus 36. The center plug 100 of the centerbody 37 forms a transition between the aft end of a turbine rotor (not shown) located just inside the combustor exhaust portion 30, and the cone 38. The center plug 100 and the cone 38 may have hollow center portions (not shown in FIG. 1) that permit cooling air to pass from an intake 39 at the aft tip of the cone to internal portions of the engine, and/or house instrumentation, wiring, or the like, etc.

Figure 2:
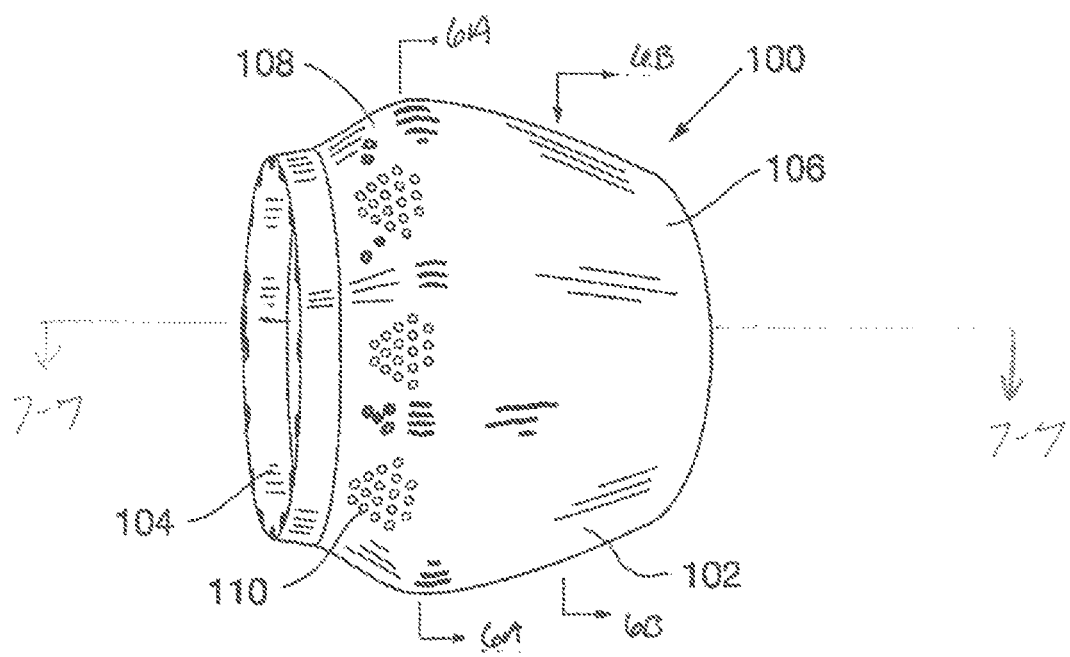
FIG. 2 is a perspective view of one embodiment of an acoustically treated hot nozzle center plug.
Figure 5:
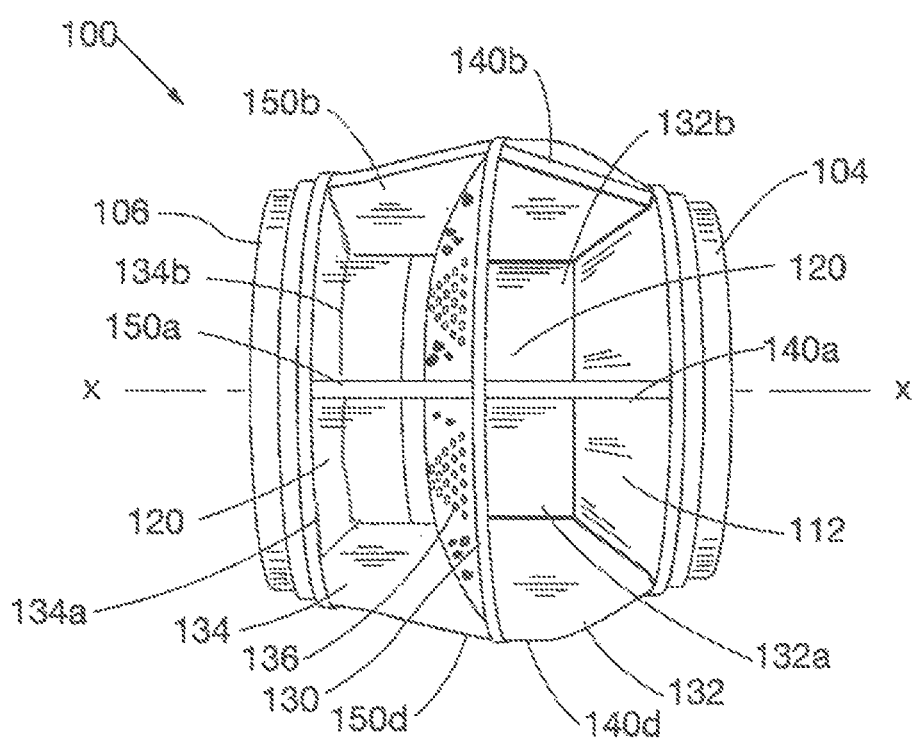
FIG. 5 is a side view of the interior portions of the center plug shown in FIG. 4.

FIG. 2 shows one embodiment of an acoustically treated center plug 100. In this embodiment, the center plug 100 includes an outer skin 102 having an aerodynamic outer contour. The outer skin 102 is seamlessly constructed such that the center plug 100 has a substantially smooth outer surface. The center plug 100 can have a forward flanged end 104 configured for attachment to a casing proximate to the aft end of a turbine rotor (not shown), and an aft flanged end 106 configured for attachment to a cone 38 like that shown in FIG. 1. As shown in FIG. 2, the outer skin 102 can include at least one acoustically permeable portion 108. The acoustically permeable portion 108 can be formed by a plurality of spaced openings 110 that extend through the outer skin 102. In the embodiment shown in FIG. 2, the acoustically permeable portion 108 is located on a forward portion of the outer skin 102, and extends around substantially the entire circumference of the forward portion of the outer skin. As shown in FIG. 2, the perforated portion 108 may coincide with a forward portion of one or more forward resonator cavities 132b (FIG. 5). Alternatively, the perforated portion 108 may coincide with an aft portion of the one or more forward resonator cavities 132b. Further details of the acoustically permeable portion 108 are described below.

Figure 3:
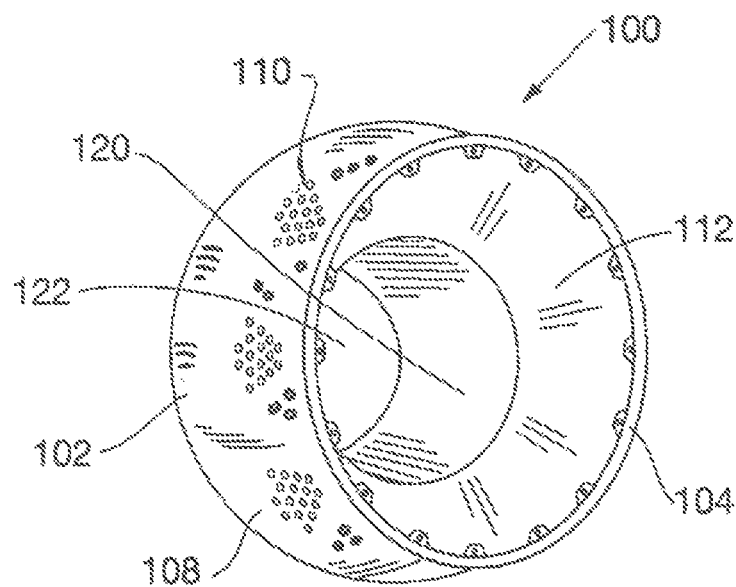
FIG. 3 is a perspective view of the hot nozzle center plug of FIG. 2 showing the forward end of the plug.

As shown in FIG. 3, the center plug 100 includes a substantially open center 122 bounded by an inner skin 120. The inner skin 120 may be constructed in segments, or in a single piece. In the embodiment shown, the inner skin 120 has a substantially cylindrical shape, and is centered along a central longitudinal axis of the center plug 100. An imperforate forward bulkhead 112 extends between the inner skin 120 and the outer skin 102 proximate to the forward flange 104. The forward bulkhead 112 is not necessarily perpendicular to the longitudinal axis. It may be formed so the inner portion of the bulkhead is aft of the outer portion, which will be described below as canted inwardly.

Figure 4:
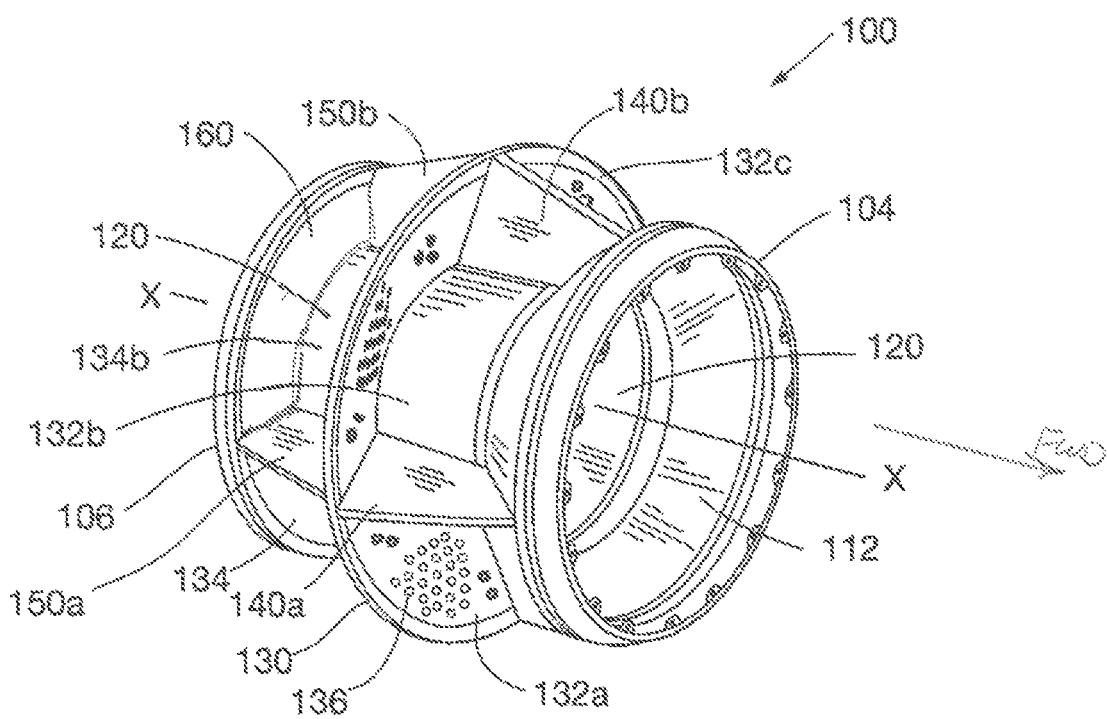
FIG. 4 is a perspective view of the hot nozzle center plug of FIGS. 2 and 3 with the outer skin removed.

FIGS. 4 and 5 show the center plug 100 with the outer skin 102 removed. As shown in FIG. 4, an imperforate aft bulkhead 160 is not necessarily perpendicular to the longitudinal axis. It may be formed so the inner portion of the bulkhead is forward of the outer portion, which will be described below as canted inwardly. The aft bulkhead 160 is located proximate to the aft flange 106 inwardly and extends between the inner skin 120 and the outer skin (not shown in FIG. 4). A perforated intermediate wall or bulkhead 130 is located intermediate to the forward bulkhead 112 and the aft bulkhead 160. The intermediate bulkhead 130 divides the region bounded by the inner skin 120, the forward bulkhead 112, the aft bulkhead 160, and the outer skin 102 (not shown in FIGS. 4 and 5) into a forward annular chamber 132 and an aft annular chamber 134. The perforated intermediate bulkhead 130 provides structural support to the outer skin 102, and can prevent or at least reduce non-planar sound wave modes from propagating between the forward and aft chambers 132, 134.

A plurality of imperforate forward baffles 140a-140d (forward baffle 140c is hidden from view) can divide the forward annular chamber 132 into a plurality of forward resonator cavities 132a-132d. A plurality of imperforate aft baffles 150a-150d (aft baffle 150c is hidden from view) similarly can divide the aft annular chamber 134 into a plurality of aft resonator cavities 134a-134d. In the embodiment shown in FIGS. 4 and 5, four forward baffles 140a-140d divide the forward chamber 132 into four forward resonator cavities 132a-132d having substantially equal volumes and dimensions. Similarly, four aft baffles 150a-150d divide the aft chamber 134 into four forward resonator cavities 134a-134d having substantially equal volumes and dimensions. In this embodiment, each of the forward baffles 140a-140d is axially aligned with one of the aft baffles 150a-150d. As shown in FIG. 5, each of the baffles 140a-

140d (and each of the axially aligned aft baffles 150a-150d) extends substantially radially outward from the central longitudinal axis "x-x" of the center plug 100. The forward and aft baffles 140a-140d and 150a-150d act to at least partially prevent sound waves that enter the resonator cavities 132a-132d and 134a-134d from propagating in a circumferential direction between adjacent cavities, and helps to restrict the sound waves to lower order modes of oscillation and propagation, such as plane wave modes.

Referring to FIGS. 4 and 5, in an alternative embodiment the perforated bulkhead 130 may be removed so as not to longitudinally divide the cavity.

The inwardly canted aft bulkhead 160 allows for improved maintenance access.

Figure 6A:
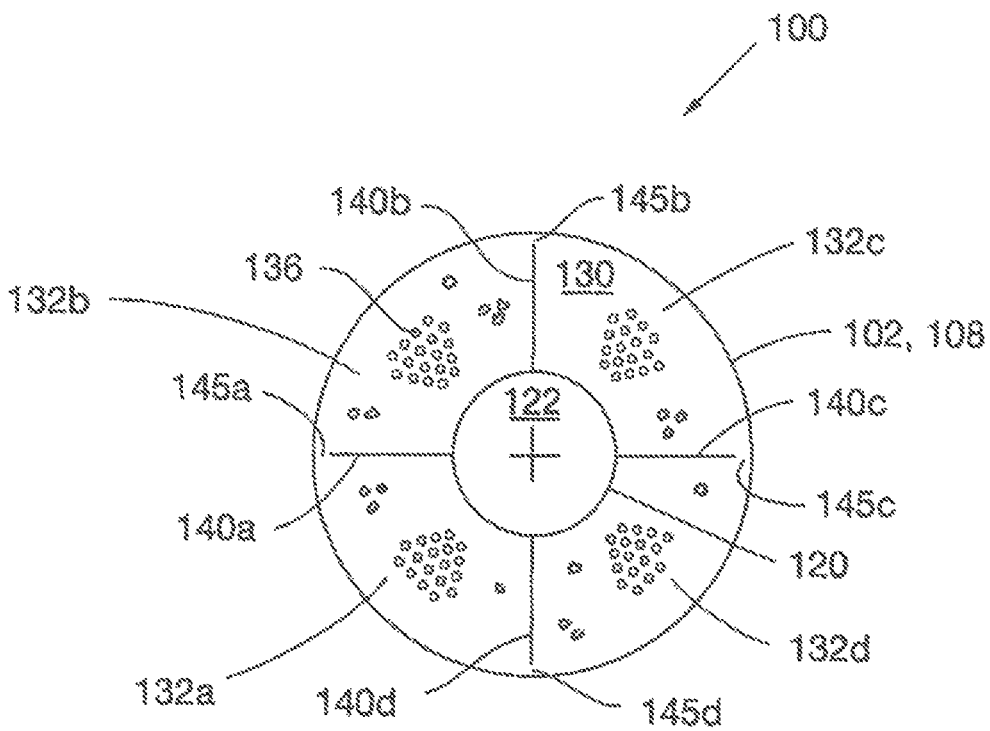
FIG. 6A is a cross-sectional view of a forward portion of the hot nozzle center plug of FIGS. 2-5 taken along line 6A-6A in FIG. 2.
Figure 6B:
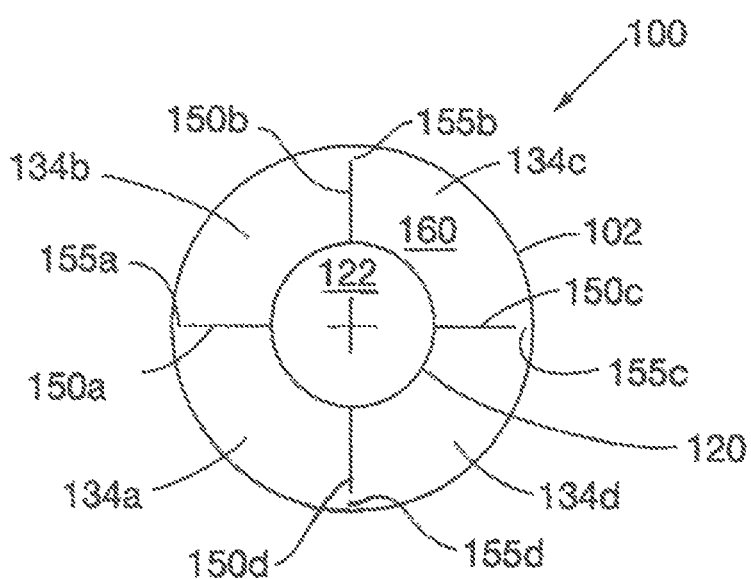
FIG. 6B is a cross-sectional view of an aft portion of the hot nozzle center plug of FIGS. 2-5 taken along line 6B-6B in FIG. 2.

As shown in FIG. 6A, small radial gaps 145a-145d may exist between the outermost edges of the forward baffles 140a-140d and the outer skin 102 in order to accommodate differential thermal expansion between the baffles 140a-140d and the outer skin 102 during thermal transient conditions. Similarly, as shown in FIG. 6B, gaps 155a-155d may exist between the outermost edges of the aft baffles 150a-150d and the outer skin 102 in order to accommodate differential thermal expansion between the baffles 150a-150d and the outer skin 102 during thermal transients. Such gaps 145a-145d, 155a-155b do not substantially adversely affect the ability of the resonator cavities 132a-132d and 134a-134d to dissipate targeted low-frequency sound energy.

Figure 7:
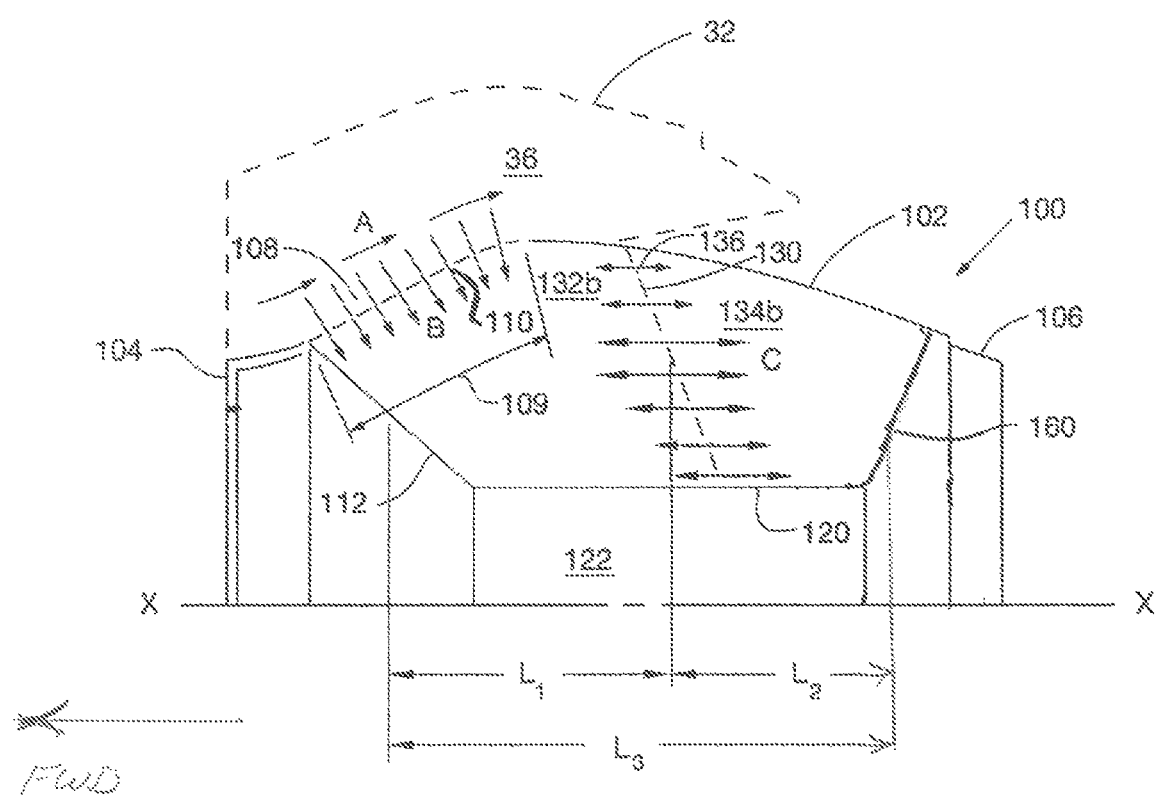
FIG. 7 is a partial cross-sectional view of the center plug shown in FIGS. 1-6B taken along line 7-7 in FIG. 2.

FIG. 7 shows a partial longitudinal cross section of the center plug 100 described above. Also shown in phantom lines in FIG. 7 is an exhaust nozzle 32 that in conjunction with the outer skin 102 of the center plug 100 defines an annular exhaust duct 36. As indicated by arrows "A" in FIG. 7, exhaust gases from the engine combustor pass through the annular duct 36 and create grazing flow that is substantially parallel to the outer surface of the perforated portion 108 of the outer skin 102. The velocity of the grazing exhaust flow at the perforated portion 108 typically can be about Mach 0.2 to about Mach 0.4, or higher. Sound waves from the grazing flow "A" propagate through the perforated portion 108 of the outer skin 102 and into the forward resonator cavity 132b in a direction generally indicated by arrows "B". Note that arrows "B" are substantially perpendicular to the perforated portion 108 of the outer skin 102. In this embodiment, the perforated portion 108 of the outer skin 102 can have a POA of about 20 percent to about 25 percent. The perforated portion 108 may have a higher or lower POA depending upon the desired acoustic impedance and aerodynamic performance of the perforated portion 108. In one embodiment, the perforated portion 108 of the outer skin has a substantially uniform thickness of about 0.02 inches (0.51 mm) to about 0.05 inches (1.27 mm), and includes a plurality of spaced openings 110 extending therethrough. The openings 110 can have a diameter of about 0.005 inches (0.13 mm) to about 0.050 inches (1.27 mm), or any other desired size. In one embodiment, the openings are about 0.02 inches (0.51 mm) in diameter. These small-diameter openings 110 have an insubstantial effect upon the aerodynamic performance of the outer skin 102, and may be formed in the outer skin 102 by laser drilling, for example. Such small-diameter openings 110 are preferable over larger punched holes that typically range from about 0.04 inches (1.02 mm) to about 0.08 inches (2.03 mm) in diameter.

In one embodiment, the perforated intermediate bulkhead 130 can have a POA of about 30 percent to about 40 percent. The intermediate bulkhead 130 may have a higher or lower POA depending upon the desired acoustic impedance of the bulkhead 130. In one embodiment, the intermediate bulkhead 130 is constructed of an aerospace grade titanium alloy, has a substantially uniform thickness of about for example 0.032 inches (0.813 mm), and includes a plurality of spaced openings 136 extending therethrough. In one embodiment, the openings 136 have a diameter of about 0.25 inches (6.35 mm). Alternatively, the openings 136 can have a different diameter to provide a different POA and/or spacing of the openings 136, if desired. The intermediate bulkhead 130 may provide structural support to the outer skin 102.

As shown in FIG. 7, the largest dimensions ($L_1$, $L_2$) of the resonator cavities 132b, 134b extend in a direction that is substantially parallel to the longitudinal axis of the center plug. Though FIG. 7 shows only one forward cavity 132b and one aft cavity 134b, it should be understood that other circumferentially spaced sets of aligned forward and aft cavities also can exist in the center plug 100 as shown in FIGS. 4 and 5, for example. In operation, sound waves enter the forward cavity 132b in a first direction (indicated by arrows "B"), but propagate through air within the forward and aft cavities 132b, 134b and through the perforated intermediate bulkhead in a second direction (indicated by arrows "C") that is substantially non-parallel to the first direction B. As shown in FIG. 7, the axially aligned resonator cavities 132b and 134b make effective use of the available longitudinal extent of the center plug 10, such that the effective maximum lengths or depths of the forward and aft resonator cavities ($L_1$, $L_2$) and their combined length "$L_3$" are substantially greater than they otherwise would be if the cavities were of the conventional non-folding type described above. As a result, the relatively deep forward and aft resonator cavities 132a-132d and 134a-134d of the center plug 100 can be tuned to resonantly respond to relatively low-frequency sound energy less than about 800 Hz, and thus dissipate sound energy at such frequencies.

In one embodiment, the resonator cavities 132a-132d and 134a-134d are configured to dissipate sound energy between about 400 Hz and about 630 Hz. Accordingly, such a center plug 100 can be effective in dissipating at least some low-frequency sound energy emanating from an aircraft gas turbine engine's combustor, especially at and between idle and approach engine speeds. For relatively small or short exhaust nozzle center plugs, the intermediate bulkhead 130 may be omitted. In such a single-degree-of-freedom embodiment, the center plug 100 shown in FIG. 8 would include a single cavity extending between the forward bulkhead 112 and the inward canted aft bulkhead 160 (either of which or both may be built at an angle other than perpendicular to the longitudinal axis).

Figures 8, 9:
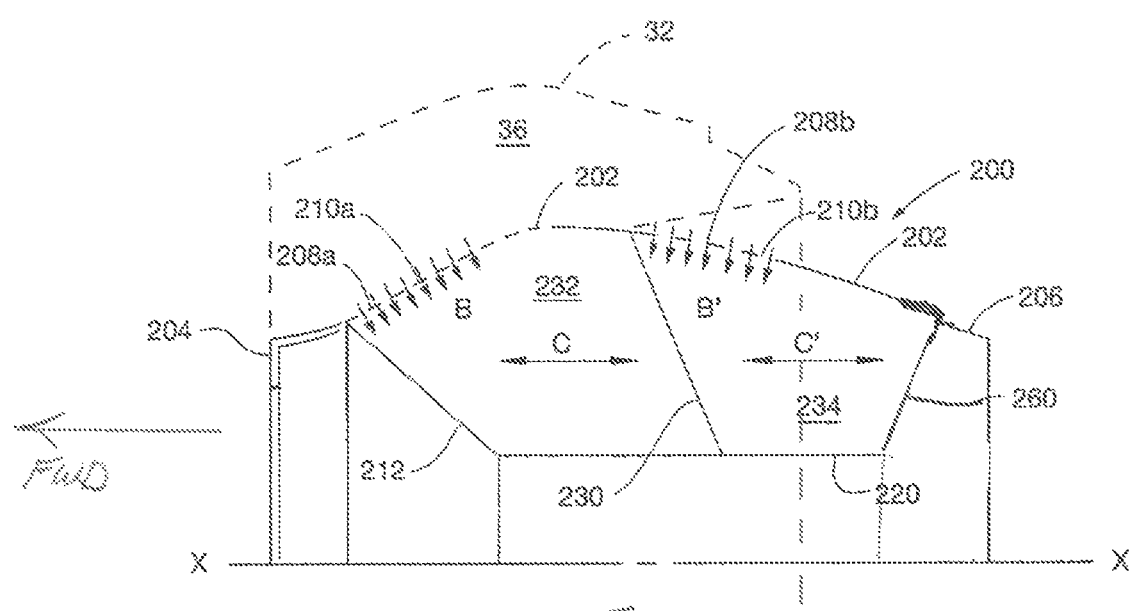
FIG. 8 is a partial longitudinal cross-section of another embodiment of a hot nozzle center plug.
FIG. 9 is a partial longitudinal cross-section of yet another embodiment of an acoustically treated hot nozzle center plug.

FIG. 8 shows another embodiment of a hot nozzle center plug 200. In this embodiment, the center plug 200 includes a plurality of circumferentially spaced forward resonator cavities 232, and a plurality of circumferentially spaced aft resonator cavities 234. The forward and aft cavities 232, 234 are bounded by an inner skin 220, an outer skin 202, a forward imperforate bulkhead 212 proximate to a forward flange 204, and an aft imperforate bulkhead 260 proximate to an aft flange 206. The bulkhead 260 may be canted inwardly. An imperforate intermediate bulkhead 230 separates the forward and aft cavities 232, 234. Unlike the center plug 100 described above, the imperforate intermediate bulkhead 230 substantially prevents sound waves from propagating between the forward and aft cavities 232, 234. Sound waves from the annular exhaust duct 36 propagate through a forward perforated portion 208a of the outer skin 202 that coincides with a forward portion of the forward cavities 232 (as indicated by arrows B in FIG. 8), and thus enter the forward cavities 232. Sound waves also propagate through an aft perforated portion 208b of the outer skin 202 that coincides with a forward portion of the aft cavities 234 (as indicated by arrows B' in FIG. 8), and thus enter aft cavities 234. In the embodiment shown in FIG. 8, the forward and aft perforated portions 208a, 208b form separate perforated bands that extend around substantially the full circumference of the outer skin 202. Though the positions of the perforated portions 208a, 208b shown in FIG. 8 coincide with forward portions of their respective cavities 232, 234, it should be understood that one or both of the perforated portions 208a, 208b can alternatively be positioned to coincide with an aft or other portion of its respective cavity 232, 234. The positions of the perforated portions 208a, 208b may be selected based upon the predicted or measured velocities of grazing exhaust flows at various axial locations along the exhaust duct 36, for example.

In the embodiment shown in FIG. 8, the forward perforated portion 208a of the outer skin 202 includes a plurality of first openings 210a extending therethrough. The aft perforated portion 208b of the outer skin 202 includes a plurality of second openings 210b extending therethrough. The sound waves respectively propagate within the cavities 232, 234 in directions C and C', which are substantially parallel to the central axis of the center plug 200, and are non-parallel to the entry directions B and B'.

In this embodiment, the forward and aft perforated portions 208a, 208b can each have a POA of about 20 percent to about 30 percent. In one embodiment of a center plug 100, the forward and aft cavities 232, 234 each can have a cavity depth of about 10 inches, and may have volumes of about 900 cubic inches and about 700 cubic inches, respectively. Alternatively, the effective cavity depths and relative volumes of the forward and aft cavities 232, 234 can be varied to tune the cavities 232, 234 to one or more target frequencies. The relatively deep longitudinal extent of the forward and aft folding resonator cavities 232, 234 permits the cavities to be tuned to dissipate sound energy at frequencies less than about 800 Hz. In one embodiment, the cavities 232, 234 can be tuned to dissipate sound energy at a peak frequency of about 500 Hz.

FIG. 9 shows a center plug 300 having substantially non-folding forward and aft resonator cavities 332, 334. As discussed below, such non-folding resonator cavities typically are less effective at dissipating low-frequency sound energy of 800 Hz or less, but can be useful in certain applications. In this arrangement, the center plug 300 includes a plurality of circumferentially spaced forward resonator cavities 332, and a plurality of circumferentially spaced aft resonator cavities 334. The forward and aft cavities 332, 334 are bounded by an inner skin 320, an outer skin 302, a forward imperforate canted bulkhead 312 proximate to a forward flange 304, and an aft imperforate inwardly canted bulkhead 360 proximate to an aft flange 306. An imperforate intermediate bulkhead 330 separates the forward and aft cavities 332, 334. The imperforate intermediate bulkhead 330 substantially prevents sound waves from propagating between the forward and aft cavities 332, 334.

In an embodiment shown in FIG. 9, substantially the full extent of the outer skin 302 between the forward bulkhead 312 and aft bulkhead 360 can include a plurality of spaced openings 310 extending therethrough. The bulkheads 312, 360 may be canted inwardly. Accordingly, the perforated portion of the outer skin 302 is substantially more extensive than the relatively short axial extents of the perforated portions 108, 208a, 208b of the center plugs 100, 200 shown in FIGS. 7 and 8. In this embodiment, the perforated portions of the outer skin 302 may have a POA of about 20 percent to about 30 percent. The openings 310 permit sound waves from the annular exhaust duct 36 to propagate through the outer skin 302, into the forward cavities 332 (as indicated by arrows B in FIG. 9), and into the aft cavities 334 (as indicated by arrows B' in FIG. 9). The sound waves generally propagate within the cavities 332, 334 in directions C and C', which are substantially parallel to the entry directions B and B'. Thus, in this embodiment, the forward and aft cavities 332, 334 are of the non-folding type, and have relatively shallow effective cavity depths as compared to the cavities of the center plugs 100, 200 described above. For example, the forward resonator cavities 332 may each have an effective depth of about 5 inches (127 mm) and a volume of about cubic 900 inches, and the aft resonator cavities 334 each have an effective depth of about 4 inches (101.6 mm) and a volume of about 700 inches. Because of the relatively shallow effective depths of the forward and aft non-folding resonator cavities 332, 334, the cavities 332, 334 only can be effectively tuned to dissipate sound energy at frequencies of about 1000 Hz or greater. Accordingly, such a center plug 300 may be less capable of dissipating low-frequency sound energy of the type produced by an aircraft gas turbine engine's combustor, but can be useful in certain applications.

Figure 10:
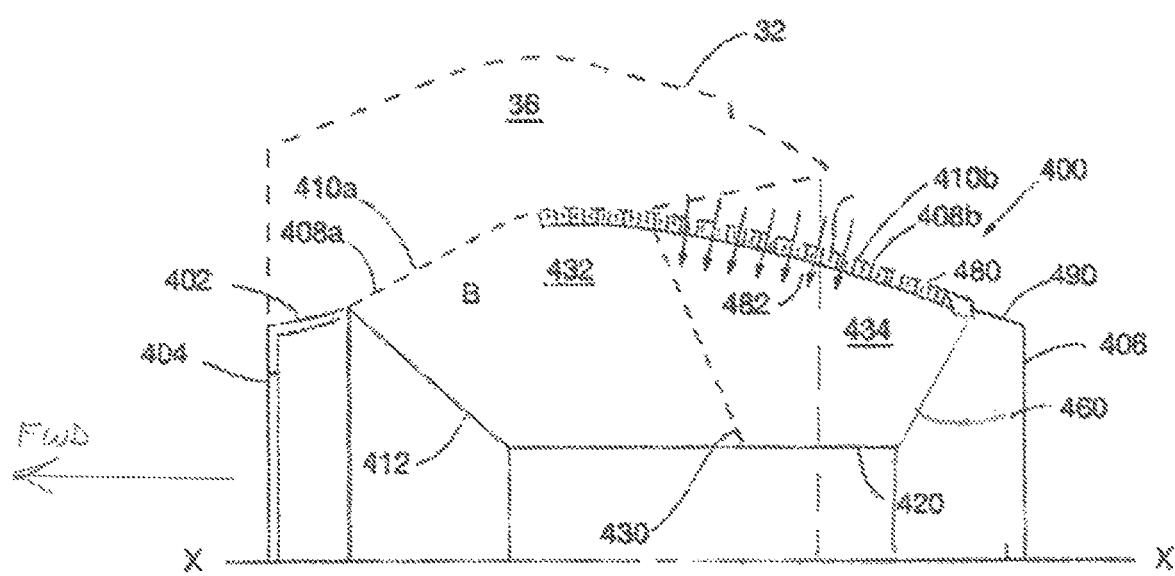
FIG. 10 is a partial longitudinal cross-section of still yet another embodiment of a hot nozzle center plug.

FIG. 10 shows another embodiment of an acoustically treated center plug 400. As can be seen by comparing FIG. 10 to FIG. 7, the center plug 400 can be constructed substantially the same as the center plug 100 described above, but with additional high-frequency acoustic treatment along aft portions of the outer skin 402. In this embodiment, the outer skin can include a forward perforated portion 408a that can include a plurality of spaced forward openings 410a extending therethrough, and an aft perforated portion 408b that can include a plurality of spaced openings 410b extending therethrough. The spaced forward openings 410a permit sound waves to enter a large forward folding cavity 432 bounded by the outer skin 402, an imperforate forward bulkhead 412 that is canted inwardly, a perforated intermediate bulkhead 430, and an inner skin 420. The perforated intermediate bulkhead 430 permits sound waves to propagate through the bulkhead 430 and into a large aft folding cavity 434. Accordingly, the large folding cavities 432, 434 of the center plug 400 can be tuned to absorb and dissipate relatively low-frequency sound energy at less than about 800 Hz.

The aft perforated portion 408b of the outer skin 402 substantially coincides with the extent of a cellular core 480 affixed along the inside surface of the outer skin 402. As shown in FIG. 10, the aft perforated portion 408b, cellular core, and an imperforate back skin 482 combine to form a non-folding acoustic liner 490 of a type described above. The acoustic liner 490 may be of the single-degree-of-freedom type as shown in FIG. 10, or can be of the multiple-degree-of-freedom type. The relatively shallow, small-volume resonator cavities of the acoustic liner 490 can be tuned to absorb and dissipate high frequency sound energy within the sound spectrum found proximate to the exhaust nozzle center plug 400. Accordingly, in this embodiment, the center plug 400 is capable of absorbing/dissipating at least some relatively low frequency exhaust noise, and at least some relatively high-frequency exhaust noise.

In each of the center plug embodiments 100, 200, 300, 400 described above, the outer skins 102, 202, 302, 402, inner skins 120, 220, 320, 420, forward bulkheads 112, 212, 312, 412, inwardly canted aft bulkheads 160, 260, 360, 460, intermediate bulkheads 130, 230, 330, 430, forward baffles 140a-140d, and aft baffles 150a-150d can be constructed of metal alloy sheet capable of withstanding temperatures greater than about 1230 degrees F. (666 degrees C.). For example, each of these components may by constructed of a high temperature aerospace grade titanium alloy, such as Ti-6-2-4-2, or the like. Alternatively, the various components can be constructed of different materials depending upon the operating temperatures and structural requirements for each component. The various components of the center plug 100, 200, 300, 400 can be joined by any suitable method or combination of methods, including welding and joining with fasteners, such as screws or rivets.

Inwardly canting the aft bulkhead provides improved maintenance access. Canting the aft bulkhead either inward or outward provides options for tuning the centerbody volume to reduce unwanted frequencies.

Although the different non-limiting embodiments have specific illustrated components, the embodiments are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A sound-absorbing exhaust center plug for an aircraft gas turbine engine comprising:
  a center plug body adapted for attachment within an exhaust nozzle of the engine and comprising
   an inner skin;
   an outer skin disposed radially outside of the inner skin; and
   at least one cavity within the center plug body and the at least one cavity extending between a forward bulkhead and an aft bulkhead, the aft bulkhead comprising an inner radial end, in contact with the inner skin, and an outer radial end opposite the inner radial end, the outer radial end located axially aft of the inner radial end such that the aft bulkhead is canted inwardly and the inner radial end and the outer radial end are located axially forward of an aft end of the outer skin,
  where the outer skin includes a plurality of outer skin openings providing an acoustic pathway through the outer skin and into the at least one cavity; and
  where the forward bulkhead is canted inwardly.

2. The center plug of claim 1, where the inwardly canted aft bulkhead extends from the outer radial end toward the inner radial end in a radially inward direction and in an axially forward direction.

3. The center plug of claim 1, where:
  the at least one cavity comprises a forward cavity and an aft cavity that is substantially aft of the forward cavity; and
  a wall separating the forward cavity from the aft cavity, the wall including a plurality of first openings therethrough.

4. The center plug of claim 1, where the outer skin includes a forward skin portion substantially coinciding with an axial position of the forward cavity and an aft skin portion, and where the plurality of outer skin openings are in the forward skin portion.

5. The center plug of claim 1, wherein the inner skin and the outer skin form a substantially hollow center portion of the plug body therebetween.

6. A noise-absorbing center plug for a jet engine exhaust nozzle comprising:
  a plug body adapted for assembly within the exhaust nozzle;
  a plurality of walls defining a plurality of circumferentially spaced resonator cavities within the plug body where the plurality of circumferentially spaced resonator cavities extend from a forward bulkhead to an aft bulkhead, each of the forward bulkhead and the aft bulkhead extending outward from the plug body, the aft bulkhead comprising an inner radial end, in contact with the plug body, and an outer radial end opposite the inner radial end, the outer radial end located axially aft of the inner radial end such that the aft bulkhead is canted inwardly and the inner radial end and the outer radial end are located axially forward of an aft end of the plug body;
  at least one wall separating at least one of the resonator cavities into a forward sub-cavity and an aft sub-cavity, the at least one wall including a plurality of first openings therethrough; and
  an inner skin forming a substantially open center cavity within the plug body,
  where the forward cavity includes a first largest dimension and the aft cavity includes a second largest dimension which is shorter than the first largest dimension, and where each of the first largest dimension and the second largest dimension extends in a substantially forward-aft direction; and
  where the forward bulkhead is canted inwardly.

7. The noise-absorbing center plug of claim 6, where the aft bulkhead extends from the outer radial end toward the inner radial end in a radially inward direction and in an axially forward direction.

8. The noise-absorbing center plug of claim 7, further comprising an outer skin at least partially enclosing the circumferentially spaced resonator cavities.

9. The noise-absorbing center plug of claim 8, where the outer skin includes a plurality of second openings extending therethrough, the plurality of second openings providing acoustic pathways through the outer skin and into at least one forward sub-cavity.

10. The noise-absorbing center plug of claim 8, where the outer skin includes a plurality of second openings extending therethrough and a plurality of third openings extending therethrough, the plurality of second openings providing acoustic pathways through the outer skin and into at least one forward sub-cavity, and the plurality of third openings providing acoustic pathways through the outer skin and into at least one aft sub-cavity.

11. A noise-absorbing exhaust nozzle center plug for an aircraft gas turbine engine comprising:

a plug body having a first longitudinal axis and comprising an outer skin surrounding the plug body;

an inner skin, the outer skin and the inner skin forming a substantially annular space therebetween axially extending between a forward bulkhead and inwardly canted aft bulkhead, the inwardly canted aft bulkhead comprising an inner radial end, in contact with the inner skin, and an outer radial end opposite the inner radial end, the outer radial end located axially aft of the inner radial end and the inner radial end and the outer radial end are located axially forward of an aft end of the outer skin; and a plurality of walls separating the annular space into a plurality of substantially longitudinally-extending cavities;

where the plug body is configured for assembly within an exhaust nozzle of the aircraft gas turbine engine;

where the plurality of substantially longitudinally-extending cavities includes a forward cavity and an aft cavity, where the forward cavity has a first largest dimension and the aft cavity has a second largest dimension which is shorter than the first largest dimension, and where each of the first largest dimension and the second largest dimension that extends in a substantially forward-aft direction; and where the forward bulkhead is canted inwardly.

12. The noise-absorbing exhaust nozzle center plug of claim 11, where the outer skin includes a second plurality of openings extending therethrough, the second plurality of openings forming a plurality of acoustic pathways through the outer skin and into at least a portion of the plurality of substantially longitudinally-extending cavities.

13. The noise-absorbing exhaust nozzle center plug of claim 11, where the inwardly canted aft bulkhead extends from the outer radial end toward the inner radial end in a radially inward direction and in an axially forward direction.

* * * * *